Nov. 19, 1929. C. ELLIS Re. 17,492
ASH RECEIVER
Original Filed July 25, 1927
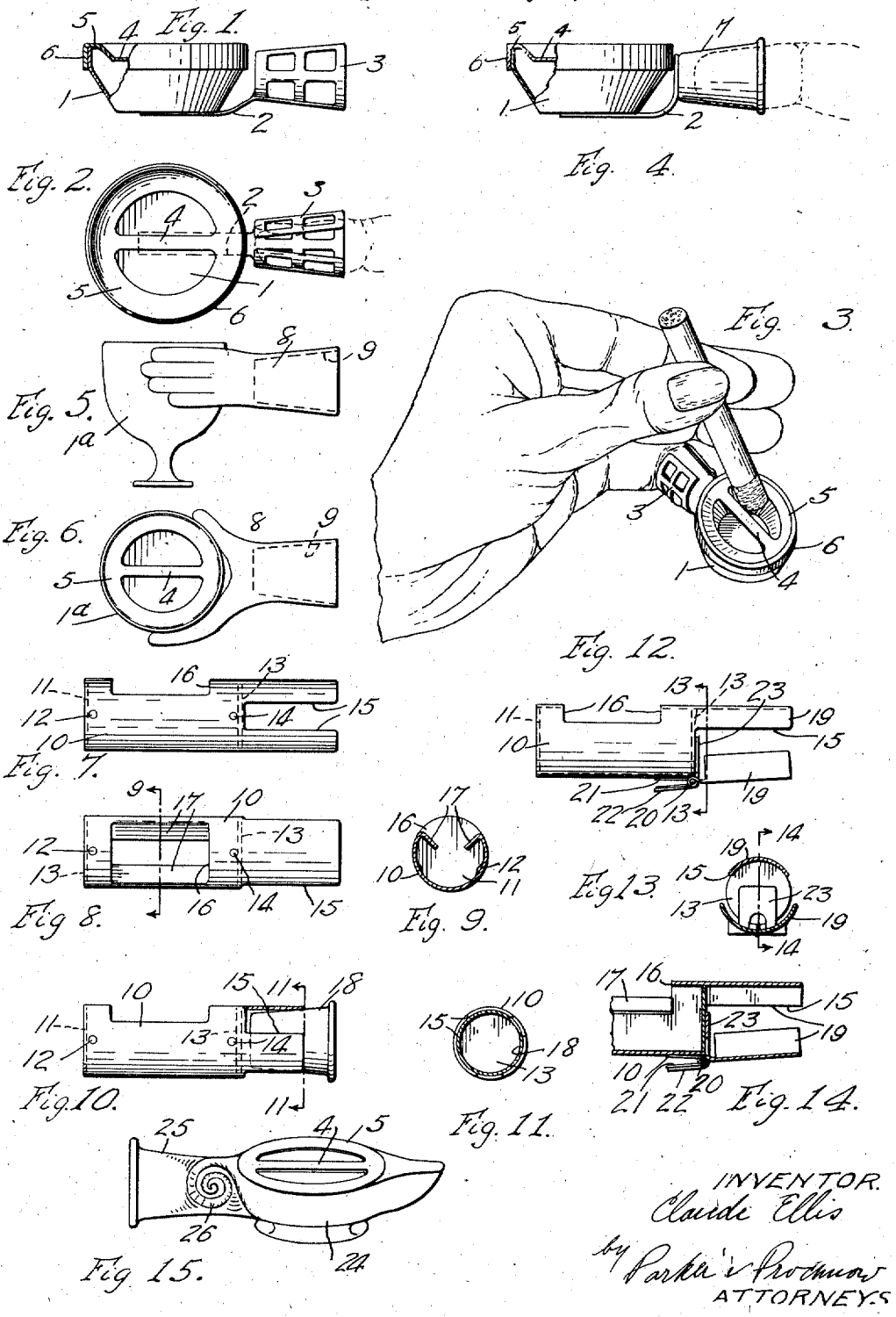
INVENTOR.
Claude Ellis
by Parker & Prochnow
ATTORNEYS

BEST AVAILABLE COPY

Reissued Nov. 19, 1929

Re. 17,492

UNITED STATES PATENT OFFICE

CLAUDE ELLIS, OF SPRINGVILLE, NEW YORK, ASSIGNOR OF ONE-HALF TO CLAYTON J. ELLIS, OF SPRINGVILLE, NEW YORK

ASH RECEIVER

Original No. 1,701,496, dated February 12, 1929, Serial No. 208,157, filed July 25, 1927. Application for reissue filed September 26, 1929. Serial No. 395,434.

This invention relates to ash receivers, and particularly to receivers designed for individual use. Heretofore, it has not always been convenient to have an ash receiver close at hand into which ashes from cigarettes and the like can be deposited at intervals while smoking. This is particularly true when sitting in chairs about a room at points not convenient to tables on which the usual ash trays are supported. Consequently, it has been necessary for a smoker to arise at frequent intervals and travel to a table or support where an ash tray may be mounted, and deposit ashes from a cigar or cigarette.

An object of the invention is to generally improve and simplify ash receivers of the individual type.

A further object of this invention is to provide an improved individual ash tray or receiver which may always be conveniently accessible, regardless of whether a person is seated at any point or moving around; with which the ashes may be deposited whenever desired while a cigarette or cigar is being smoked, without material effort or attention by the smoker, and which will be relatively simple, inconspicuous and inexpensive.

A still further object of the invention is to provide an improved individual ash receiver which may be attached to and supported by a digit of one's hand, and while so supported positioned to receive ashes from a cigar or cigarette held in the same hand by simple movements of the digits of the hand, and which will be comfortable to the smoker, easily attached to or removed from a digit of the hand and inconspicuous.

Another object is to provide an improved receiver of this type with which likelihood of spilling therefrom of ashes that may be deposited therein will be reduced to a minimum, and with which the deposit of ashes therein will be facilitated.

Various other objects and advantages will be apparent from the following description of an embodiment of the invention, and the novel features will be particularly pointed out hereinafter in connection with the appended claims.

In the accompanying drawings:

Figure 1 is a side elevation, partly in section, of an individual ash receiver constructed in accordance with the invention.

Figure 2 is a plan of the same.

Figure 3 is a perspective illustrating the manner in which such an individual ash receiver may be attached to a finger of a smoker's hand and the ashes from a cigarette held in the same hand deposited therein by manipulation of the fingers.

Figure 4 is an elevation of another receiver also constructed in accordance with the invention, and illustrating another embodiment of the invention.

Figure 5 is a side elevation of still another embodiment of the invention.

Figure 6 is a plan of the same.

Figure 7 is a side elevation of another form of the invention.

Figure 8 is a plan of the same.

Figure 9 is a sectional elevation of the same, with the section taken approximately along the line 9—9, Fig. 8.

Figure 10 is a side elevation of still another embodiment of the invention.

Figure 11 is a sectional elevation of the same, with the section taken approximately along the line 11—11, Fig. 10.

Figure 12 is a side elevation of a further embodiment of the invention.

Figure 13 is a sectional elevation of the same, with the section taken approximately along the line 13—13, of Fig. 12.

Figure 14 is a longitudinal, sectional elevation of the same, with the section taken approximately along the line 14—14 of Fig. 13.

Figure 15 is a perspective of still another embodiment of the invention.

Referring first to Figs. 1 and 3, the individual ash receiver therein illustrated includes a cup, box or container 1 of any desired shape or size and provided with an open face or top. The bottom of this cup may be connected by a strip 2 of metal or the like to a clip attaching member 3 of a size to receive and grip the finger of a person, preferably the ungual or terminal phalanx of one of the digits of one's hand. The position of such digit in the clip or attaching member is shown by the dotted lines of Fig. 2, and in perspective in Fig. 3.

The clip or member 3 may be of any suitable or desired construction, the particular form illustrated in these figures being of skeleton formation and somewhat U-shaped in cross section with the base of the U connected to or forming a part of the strip 2 that leads to the ash receiving cup. The interior of the clip or member 3 is preferably tapered or convergent edgewise and toward the box or cup 1, so as to fit the end of one's finger very much in the manner of a thimble, except that the clip may yield or expand to some extent when moved over a finger tip and thus also yieldingly grip the finger tip. The cup is disposed in proximity to and preferably in approximate axial alinement with the portion of the finger to which the clip may be attached, that is, with the axis of the opening of the clip 3, so that the clip 3, the strip 2 and the cup 1 will form a mechanical continuation of the finger to which it may be attached, as shown clearly in Fig. 3.

To facilitate the disengagement of ashes from the burning end of a cigarette, a rod or bar 4 may be provided to extend across the open face of the cup or box 1, and if the burning end of the cigarette is brushed over this bar, the ashes will fall directly into the interior of the cup without danger of any falling outside of the cup. The open face of the cup or box 1 may also be partially closed by an annular ring 5 having an outer peripheral flange 6 which fits over or inside the open end of the box or cup in the manner of a cover, with the ring extending over the open face of the box or cup. The ring 5 may be inclined downwardly and inwardly into the cup, so as to guide into the cup any ashes which may fall upon or be deposited upon it, and the ring acts as a flange or lip around the open edge of the cup and serves to prevent spilling of the ashes as the cup is moved about with the hand to which it is attached. During sudden movements of the finger of hand to which the cup is attached, the ashes contained in the cup will tend to slide along the bottom and sides of the cup and might be thrown out of the cup by such sudden movements were it not for the flange or ring which extends from the wall of the cup at the open edge over the cavity of the cup to some extent and acts as a barrier.

The bar 4 and the ring 5 may conveniently be combined in a single structure, if desired, by forming the bar as a part of the ring, in which case the bar extends across between opposite points of the inner periphery of the ring, as shown clearly in Figs. 2 and 3. Thus, the ring and bar may be made integral as a single stamping and formed by suitable dies into the shape or configuration illustrated or desired.

The clip or attaching member 3 may be attached to one of the fingers of a smoker's hand, such as to either of the last two fingers of one's hand, and preferably to the little finger of the hand. Usually the receiver is more conveniently positioned when attached to the outer tip or phalanx of the finger as shown in Fig. 3, in which case the receiver will be disposed just at the end of that finger.

During the use of such an ash receiver, a cigarette, for example, may be held between the thumb and one of the fingers, or between any of the fingers in the usual manner. The receiver, however, is fastened to a finger of that hand in which one holds the cigarette while smoking it. When one desires to remove the ashes from the burning end of a cigarette so held, the finger carrying the receiver may be bent inwardly into the position shown in Fig. 3, the cigarette then tipped downwardly into the open end thereof, and against the bar 4 or ring 5 if they are provided, as also shown in Fig. 3, and the bent finger then straightened out or moved laterally by flexing it, which movement causes a cutting off or removal of the ashes from the cigarette, such ashes falling into the cup of the receiver.

In Fig. 4 another embodiment of the invention is illustrated, the cup, bar 4 and ring 5 being of the type shown in Figs. 1 and 2. The clip 3 of Figs. 1 to 3 is replaced by a tapered shell 7 somewhat resembling a thimble which fits over and may be wedged upon the end of the finger to which the receiver is to be secured in the same manner that a thimble is secured to one's finger. The strip 2 in such a case may be bent angularly, as shown in Fig. 4 and secured to the end of this shell. It may be necessary to provide shells 7 of varying sizes in order to fit fingers of different sizes, but the clip form of thimble disclosed in Figs. 1 to 3 will fit a considerably larger range of fingers of different sizes.

In Figs. 5 and 6 still another form of the invention is illustrated, the cup 1ª being shown as in the form of a goblet with a shell 8 simulating somewhat a gloved or mail clad hand grasping the goblet between fingers to support it. The shell 8 has a tapered, thimble-like cavity 9 for receiving the tip end of one's fingers, as in Fig. 4. This goblet is open at its top, and may be provided with a ring 5, or bar 4, or both, the same as for the cup of Figs. 1 to 4.

In Figs. 7 to 9 the receiver may include a cylindrical shell or tubular member 10. One end of the shell may be closed by a disk-like plug 11, which may be frictionally held in that end of the shell and limited in its inward movement by a plurality of slight inward indentations 12. Midway of its ends, the shell may mount an internal disk-like plug 13, which also may be frictionally held therein and limited in its inward movement by a plurality of inward indentations 14 similar to the indentations 12. The end of the shell 10 opposite the end closed by the plug 11 may be provided with slots 15 extending toward the plug 13, so as to provide spring fingers which may fit over and grip the outer end or ungual phalanx of one's finger, the slotted end of this shell or member 10 acting somewhat as a spring clip and somewhat as a thimble in its manner of attachment to one's finger. The slotted end of the shell or member 10 may also, and preferably is, made outwardly divergent to some extent to increase the thimble effect.

The opening for receiving the ashes may be provided by cutting an aperture 16 in the wall of the shell or member 10 between the plugs or disks 11 and 13. The metal along the sides of this opening may be turned downwardly and inwardly to form bars or flanges 17 (Figs. 8 and 9) which serve to assist the removal of the ashes from a cigarette the same as the bar 4 and the ring 5 of Figs. 1 to 6, these flanges also acting somewhat like the ring 5 in preventing unintentional discharge of the ashes therefrom by the movements of the finger or hand to which it is attached.

Figs. 10 and 11 illustrate a receiver very similar to that shown in Figs. 7 to 9, with the exception that the slotted end for receiving the finger tip may be made shorter and fitted over a thimble or similar shell 18 which is in turn mounted or secured to one's finger. With such an arrangement, thimble-like shells 18 may be provided of different sizes for use with each standard size of cup or member.

Figs. 12 to 14 illustrate still another form of the receiver, somewhat similar to Figs. 7 to 11, with the exception that one of the tongues 19 formed by the slot 15 is hinged to the body of the shell by a simple hinge 20, and a suitable spring 21, is provided on the hinge for urging this tongue 19 towards the fixed tongue at that end, so as to yieldingly grip the tip of one's finger to which it is attached. In such a construction, the spring 21, for example, may be a coil spring provided in the center of the hinge with its free end compressed between a tail portion 22 on the tongue 19, which extends beyond the hinge and the lower wall of the shell or receiver 10. In such an instance, one member 23 of the hinge to which the tongue 19 is connected may be secured to the end plug or disk 13 of the receiver in any suitable manner, such as by solder or rivets or both.

Obviously, the receiver may be made in various artistic forms in addition to those illustrated in Figs. 1 to 14 and may be made to resemble various familiar articles of art. For example, in Fig. 15 the cup portion 24 of the receiver is constructed in the form of a philosopher's lamp with the thimble shell 25 forming the handle thereof and enabling it to be mounted upon the tip end of one's finger, the same as with the other forms of the receiver. The thimble shell 25 may have thereon a scroll 26 representing pictorially a handle for the philosopher's lamp, whereby the artistic effect will be very greatly increased. This lamp may or may not have the ring 5 or cross bar 4, or both, such as described in connection with Figs. 1 to 6.

The receivers of Figs. 5 to 15 may be manipulated or used in the manner described for the receiver illustrated in Figs. 1 to 3.

It will be understood that various changes in the details, which have been herein described and illustrated in order to explain the nature of the invention, may be made by those skilled in the art within the principle and scope of the invention as expressed in the appended claims.

I claim as my invention:—

1. An individual ash receiver having a socket section formed to fit and be mounted on and carried by the tip end of a finger of one's hand, and an ash receiving section connected to said socket sections and extending therefrom in the direction in which that finger points, so as to position the ash receiving section adjacent to and beyond the end of that finger.

2. An individual ash receiver comprising a tapered socket to receive and fit over the tip end of a finger of one's hand, and an ash receptacle connected to said socket and extending therefrom in the direction in which that finger points, so as to constitute a mechanical, approximately straight out extension of that finger.

3. An individual ash receiver comprising a socket to receive and fit over the tip end of a finger of one's hand, the socket being formed of resilient material, and split in a longitudinal direction to fit resiliently fingers of different sizes, and an ash receptacle connected to said socket and extending therefrom in the direction in which points the finger on which the socket is mounted.

4. An ash receiver comprising a support having a socket with a longitudinally extending taper corresponding approximately to the diameter and average taper of one's finger, and being longitudinally split and of resilient material to fit over one's finger and be held by engagement with the finger against turning thereon, and a receptacle for ashes carried by said support.

5. An ash receiver comprising a support having a socket with a longitudinally extending taper corresponding approximately to the diameter and average taper of one's finger so as to fit over one's finger and be held by engagement with the finger against turning thereon without material discomfort to the wearer, and a receptacle for ashes carried by said support.

6. An ash receiver comprising a support having a relatively long socket of skeleton form to fit snugly over one's finger with the skin of the finger protruding somewhat into the openings of the form and holding the support against turning thereon, and a receptacle for ashes carried by said support.

CLAUDE ELLIS.